United States Patent
Narcus et al.

(10) Patent No.: US 10,641,123 B1
(45) Date of Patent: May 5, 2020

(54) GENERATOR COOLING IMPELLER AND BEARING/ROTOR COOLING

(71) Applicant: Florida Turbine Technologies, Inc., Jupiter, FL (US)

(72) Inventors: Andrew R Narcus, Loxahatchee, FL (US); Cheryl A Schopf, Jupiter, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 0 days.

(21) Appl. No.: 15/928,489

(22) Filed: Mar. 22, 2018

(51) Int. Cl.
| | |
|---|---|
| H02K 7/18 | (2006.01) |
| H02K 9/04 | (2006.01) |
| F01D 15/10 | (2006.01) |
| F02C 3/08 | (2006.01) |
| H02K 5/167 | (2006.01) |
| B64D 27/02 | (2006.01) |
| B64C 39/02 | (2006.01) |

(52) U.S. Cl.
CPC ............... *F01D 15/10* (2013.01); *F02C 3/08* (2013.01); *H02K 5/1672* (2013.01); *H02K 7/1823* (2013.01); *H02K 9/04* (2013.01); *B64C 39/024* (2013.01); *B64C 2201/042* (2013.01); *B64C 2201/048* (2013.01); *B64D 2027/026* (2013.01); *F05D 2220/32* (2013.01); *F05D 2220/76* (2013.01); *F05D 2260/20* (2013.01)

(58) Field of Classification Search
CPC ........ F01D 15/10; H02K 9/04; H02K 7/1823; H02K 5/1672; F02C 3/08; F05D 2260/20; F05D 2220/76; F05D 2220/32; B64D 2027/026; B64D 2201/048; B64D 39/024; B64D 2201/042

See application file for complete search history.

(56) References Cited

U.S. PATENT DOCUMENTS

| | | | | |
|---|---|---|---|---|
| 771,468 | A * | 10/1904 | Falk .................... | H02K 9/18 310/57 |
| 1,551,295 | A * | 8/1925 | Fletcher ............... | H02K 9/14 310/62 |
| 4,531,357 | A * | 7/1985 | Weber .................. | F01D 15/10 60/785 |
| 5,497,615 | A * | 3/1996 | Noe ..................... | F02C 6/20 60/39.511 |
| 7,633,193 | B2 * | 12/2009 | Masoudipour ......... | H02K 9/19 310/54 |
| 2004/0200215 | A1 * | 10/2004 | Woollenweber ....... | F01D 15/10 60/407 |
| 2005/0284150 | A1 * | 12/2005 | Dittmar ................ | B64D 41/00 60/788 |

(Continued)

*Primary Examiner* — Tulsidas C Patel
*Assistant Examiner* — S. Mikailoff
(74) *Attorney, Agent, or Firm* — Koenig IP Works, PLLC; Katherine Koenig

(57) ABSTRACT

A power plant for an aircraft such as a UAV with a gas turbine engine that drives an electric generator to produce electrical power. The electric generator is rotatably supported by two foil bearings. A centrifugal compressor is secured to a forward side of the generator rotor shaft. The centrifugal compressor draws in cooling air that flows through the two foil bearings and between a space formed between the rotor coil and the stator coil of the electric generator to provide for cooling of both foil bearings and the coils of the generator.

6 Claims, 1 Drawing Sheet

(56) References Cited

U.S. PATENT DOCUMENTS

2008/0197634 A1\* 8/2008 Himmelmann ......... F01D 15/10
290/52
2010/0201127 A1\* 8/2010 Himmelmann ......... F01D 15/10
290/52
2012/0306206 A1\* 12/2012 Agrawal ............... F04D 25/024
290/52

\* cited by examiner

GENERATOR COOLING IMPELLER AND BEARING/ROTOR COOLING

GOVERNMENT LICENSE RIGHTS

This invention was made with U.S. Government support under contract number FA8650-14-D-2400-FA8650-17-F-2707 awarded by the U.S. Air Force Research Laboratory. The U.S. Government has certain rights in the invention.

CROSS-REFERENCE TO RELATED APPLICATIONS

None.

BACKGROUND OF THE INVENTION

Field of the Invention

The present invention relates generally to a small gas turbine engine to power an aircraft such as a UAV, and more specifically to an electric generator and bearing cooling assembly for a small gas turbine engine.

Description of the Related Art Including Information Disclosed Under 37 CFR 1.97 and 1.98

Small gas turbine engines are being used to provide power for a small aircraft such as an Unmanned Aero Vehicle or UAV. A small gas turbine engine is used to drive an electric generator to produce electrical power that is then used to drive fans that propel and steer the UAV. For a UAV that requires long loiter times, critical features of the power plant include low weight, low volume, and reliability. If the power plant has a minimum weight, then more fuel can be carried and thus longer loiter times. The same with a low volume engine. Less space is required for the power plant, and therefore more fuel can be carried. Reliability is critical in that the power plant must be capable of sustaining the mission.

BRIEF SUMMARY OF THE INVENTION

A power plant for an aircraft such as a UAV with a gas turbine engine that drives an electric generator to produce electrical power. The electric generator is rotatably supported by two foil bearings. A centrifugal compressor is secured to a forward side of the generator rotor shaft. The centrifugal compressor draws in cooling air that flows through the two foil bearings and between a space formed between the rotor coil and the stator coil of the electric generator to provide for cooling of both foil bearings and the coils of the generator.

An air seal is located between an inlet of the centrifugal compressor and the generator housing to form a seal so that the cooling air is drawn into the centrifugal compressor. The power plant with the rotor supported by foil bearings of the present invention can also be used for turbo-alternator applications.

DETAILED DESCRIPTION OF THE INVENTION

The present invention is a small gas turbine engine that drives an electric generator to produce electrical power for an aircraft such as for propelling and steering a UAV or Unmanned Aero Vehicle. The electric generator is rotatably supported by two foil bearings, and the generator stator and rotor and the two foil bearings are cooled by forcing cooling air across the generator and foil bearings using a compressor secured to a forward side of the rotor shaft. The power plant with the rotor supported by foil bearings of the present invention can also be used for turbo-alternator applications.

Figure 1:
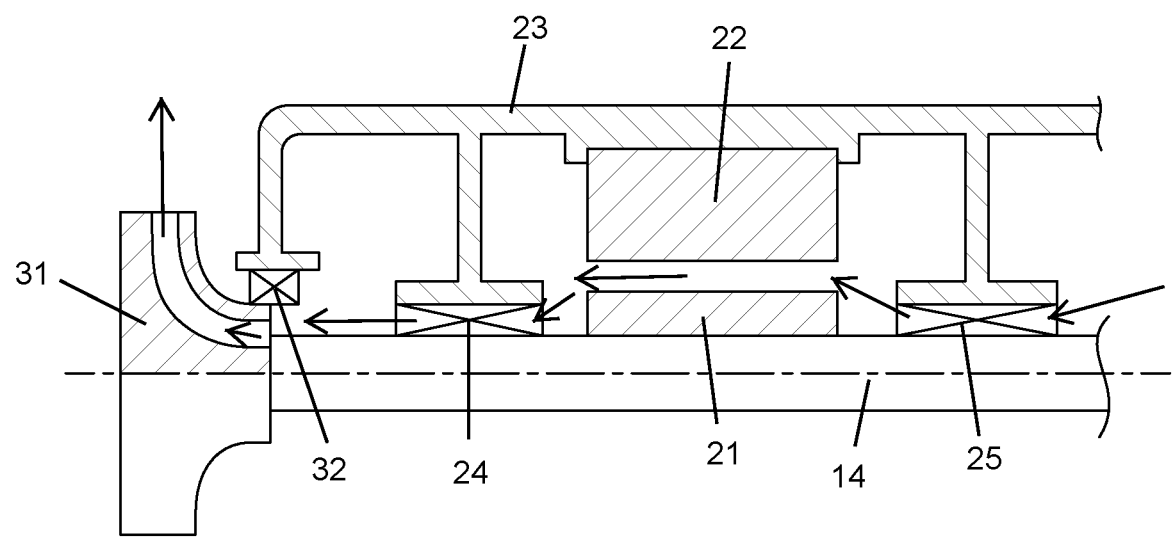
FIGS. 1 and 2 show a cross-section of a small gas turbine engine driving an electric generator supported by bearings with a cooling arrangement of the present invention.
Figure 2:
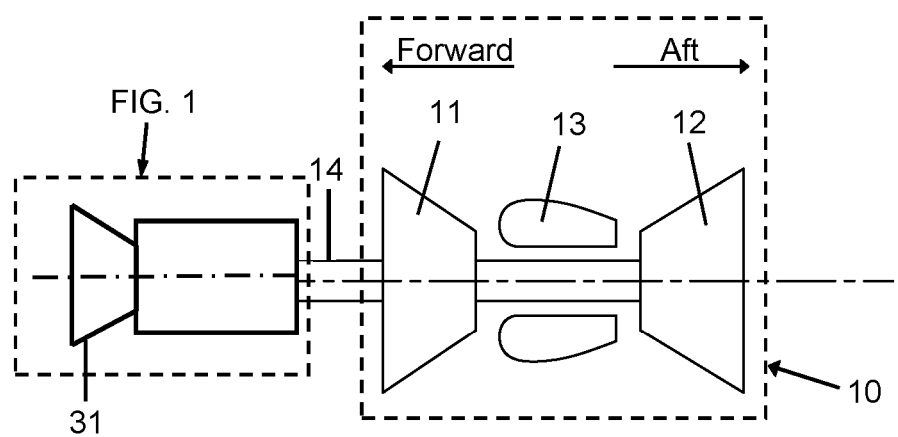

FIGS. 1 and 2 show cross-sections of the power plant and electric generator of the present invention. The power plant includes a small gas turbine engine 10 with a compressor 11 connected to a gas turbine 12 by a rotor shaft 14, and a combustor 13 positioned in between. The engine 10 drives an electric generator having a rotor coil 21 secured to the shaft 14 and a stator coil 22 secured to a casing 23 of the power plant. The shaft 14 of the electric generator is rotatably supported by a forward foil bearing 24 and an aft foil bearing 25. Foil bearings are used to support the generator shaft 14 because foil bearings do not require lubrication and can operate at very high speeds. The small engine 10 of the present invention operates at around 130,000 rpm and thus roller bearings cannot be used.

To provide cooling for the electric generator and the foil bearings, a centrifugal compressor 31 is secured to a forward side of the shaft 14 and rotates therewith. The centrifugal compressor 31 draws in air from outside the core of the generator and across the two foil bearings 24 and 25 and through a space between the rotor 21 and stator 22 coils of the generator. A seal 32 is used to provide for an air seal between the compressor inlet and the housing 23 so that the cooling air flows into the inlet of the centrifugal compressor 31.

We claim the following:
1. A power plant for a small aircraft comprising:
   a gas turbine engine with a first compressor and a turbine on a rotor shaft, the rotor shaft including a forward end and an aft end;
   the first compressor is located on the forward end of the rotor shaft and the turbine is located on the aft end of the rotor shaft;
   an electric generator rotatably connected to the gas turbine engine, the electric generator having a stator and a rotor with a space therebetween;
   a forward bearing and an aft bearing, the electric generator being rotatably supported by the forward bearing and the aft bearing; and
   a second compressor rotatably connected to the electric generator, the second compressor being configured to draw in cooling air to flow through the two bearings and in the space between the stator and the rotor to provide cooling for the forward bearing, the aft bearing, and the electric generator.
2. The power plant of claim 1, wherein:
   the gas turbine engine and the electric generator are both on the rotor shaft.
3. The power plant of claim 1, wherein:
   the second compressor is a centrifugal compressor with an impeller having an axial inlet and a radial outlet.
4. The power plant of claim 3, wherein the electric generator includes a housing, the power plant further comprising:

an air seal between the axial inlet of the centrifugal compressor and the housing of the electric generator.

5. The power plant of claim 1, wherein:

the second compressor is on the forward end of the rotor shaft of the first compressor.

6. The power plant of claim 1, wherein:

the forward bearing and the aft bearing are both foil bearings.

* * * * *